(12) United States Patent
Kim et al.

(10) Patent No.: US 7,931,111 B2
(45) Date of Patent: Apr. 26, 2011

(54) LIFT DEVICE OF ACTIVE HOOD SYSTEM

(75) Inventors: Koo Hyun Kim, Gyeonggi-do (KR); Sung Wook Hong, Seoul (KR); Ji Young Song, Gyeonggi-do (KR); Dae Yub Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 202 days.

(21) Appl. No.: 12/271,422

(22) Filed: Nov. 14, 2008

(65) Prior Publication Data
US 2009/0289474 A1    Nov. 26, 2009

(30) Foreign Application Priority Data
May 21, 2008   (KR) .................. 10-2008-0047129

(51) Int. Cl.
B62D 25/12 (2006.01)
B60R 21/34 (2011.01)
(52) U.S. Cl. .................. 180/274; 296/193.11
(58) Field of Classification Search .......... 180/274, 180/281, 69.21; 296/193.11; B62D 25/12; B60R 21/34
See application file for complete search history.

(56) References Cited

U.S. PATENT DOCUMENTS

| | | | | |
|---|---|---|---|---|
| 3,815,176 A * | 6/1974 | Porter | | 16/288 |
| 6,571,901 B2 | 6/2003 | Lee | | |
| 6,668,962 B2 * | 12/2003 | Son | | 180/274 |
| 7,159,685 B2 * | 1/2007 | Knight-Newbury et al. | | 180/274 |
| 7,303,040 B2 * | 12/2007 | Green et al. | | 180/274 |
| 7,410,027 B2 * | 8/2008 | Howard | | 180/274 |
| 7,506,716 B1 * | 3/2009 | Salmon et al. | | 180/274 |
| 7,552,789 B2 * | 6/2009 | Gust | | 180/69.21 |
| 7,712,569 B2 * | 5/2010 | Scheuch et al. | | 180/274 |
| 2007/0062748 A1 * | 3/2007 | Erwin | | 180/69.21 |

FOREIGN PATENT DOCUMENTS

| | | | |
|---|---|---|---|
| EP | 1541432 A1 * | 6/2005 | |
| EP | 1559638 A2 * | 8/2005 | |
| EP | 1745993 A1 * | 1/2007 | |
| JP | 10305782 A * | 11/1998 | |
| WO | WO 2004083007 A1 * | 9/2004 | |
| WO | WO 2004110826 A1 * | 12/2004 | |

* cited by examiner

Primary Examiner — Faye M. Fleming
Assistant Examiner — Drew Brown
(74) Attorney, Agent, or Firm — Morgan, Lewis & Bockius LLP

(57) ABSTRACT

A lift device of an active hood system is adapted to lift up the rear of a hood for a vehicle. The lift device of the active hood system includes a striker placed on the hood, a latch unit placed in an engine compartment for locking and unlocking the striker, and an elastic member placed between the striker and the latch unit for raising up the hood. The lift device lifts up the hood by a mechanism which employs the elastic force of the elastic member. Accordingly, the lift device greatly reduces the impact applied to a pedestrian during a collision of the vehicle with the pedestrian, and improves the device's security. Moreover, the lift device is locked or unlocked by the striker and the latch unit, thereby making it reusable, easy to handle, and reducing its manufacturing and repair costs.

17 Claims, 5 Drawing Sheets

LIFT DEVICE OF ACTIVE HOOD SYSTEM

CROSS-REFERENCE TO RELATED APPLICATION

The present application claims priority to Korean Patent Application No. 10-2008-0047129, filed on May 21, 2008, the entire contents of which is incorporated herein for all purposes by this reference.

BACKGROUND OF THE INVENTION

1. Field of the Invention

The present invention relates to a lift device for an active hood system, and particularly to a lift device of an active hood system for lifting up a hood in a mechanical system, which employs a suppressed elastic force so as to greatly reduce the impact and injury to the pedestrian during collision 2. Description of Related Art In general, a passenger vehicle is provided with an engine compartment that is enclosed with a hood. The engine compartment includes components, such as an engine and the like, which are compactly placed therein. The hood protects the parts arranged in the engine compartment from the exterior. To this end, the hood is fixed to the top surface of the engine compartment by means of an upwardly pivotable (or rotatable) hinge.

Such a vehicle could collide with a pedestrian. If so, the pedestrian would first strike the front bumper of the vehicle, then, the pedestrian would bump one's head against the hood while falling toward the upper surface of hood. Due to this, the impact derived from the series of impacts may result in serious injury to the pedestrian.

Recently, pedestrian protection regulations are being enforced due to the aforementioned dangers. To meet the pedestrian protection regulations, an active hood system was proposed that is able to provide a space between the hood and the engine compartment, and sufficiently absorb the impact energy applied to a pedestrian at the time of collision with the vehicle.

For example, there is an active hood system disclosed in the Korean Publication No. 2006-0067219 ("the '219 publication"), as shown in FIG. 1. Referring to FIG. 1, the active hood system of the '219 publication includes an actuator 10, which is installed between the hood and the engine compartment. The actuator 10 lifts up the hood so as to minimize the impact applied to the pedestrian during a collision.

To this end, the actuator 10 is configured in the same structure as an antenna, which extends and shortens in multiple telescopic steps. Also, an elastic member 11 is provided in the actuator 10 having the same structure as the antenna. Furthermore, a locking member 20 is installed in a specific region of the bottom of the actuator 10 and holds the actuator 10 from being extended from a minimally shortened state.

Such an active hood system of the '219 publication allows the elastic member 11 to resiliently lift up the hood and provide the buffer space. Accordingly, the active hood system of the '219 publication can protect the pedestrian by means of the buffer space.

However, in the active hood system of the '219 publication, a connection portion between a panel and an extending rod can be moved and a joint between them can be generated. Moreover, the active hood system of the '219 publication requires a large capacity of solenoid actuator, enough to perform an unlocking operation in which a large fractional force is generated.

As another example, an active hood system with a latch actuator is described in the International Patent Publication No. 2004/000975 ("the '975 publication"). The latch actuator disclosed by the '975 publication lifts up the hood with fluid or air pressure. As a result, the size of the latch actuator is enlarged. Moreover, the fluid or gas leaks out of the latch actuator with time.

The Japanese Patent Publication No. JP 2007/296872 ("the '872 publication") discloses an active hood system with an actuator for lifting up the hood of the vehicle as another example. The actuator in the '872 publication includes a multipart extendable cylinder, a rod, and a gas generator. In the actuator, since the hood is lifted up by the pressure of the gas, which is generated in the gas generator, it is not reusable and there are difficulties in its repair and security.

For yet a further example, there is a pedestrian protection apparatus described in the International Publication Patent No. WO 2003/095273 ("the '273 publication"). The pedestrian protection apparatus of the '273 publication is simple in structure because of the use of the elastic force of a plate spring. However, the pedestrian protection apparatus should unlock the plate spring, which is suppressed by a large amount of pressure. Due to this, the pedestrian protection apparatus requires an actuator strong enough to quickly generate a large amount of power.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, various aspects of the present invention are directed to a lift device of an active hood system that substantially obviates one or more problems due to the limitations and disadvantages of the related arts as described above.

One aspect of the present invention provides a lift device of an active hood system that operates mechanically by the elastic force of a suppressed spring, in contrast to the lift devices of fluid pressure, air pressure, and powder explosion systems, thereby improving its security and efficiency.

Another aspect of the present invention provides a lift device of an active hood system that employs a combination of solenoid actuator and a latch for locking an actuator and a vehicle hood, thereby making it reusable, easy to handle, and greatly reducing manufacturing and repair costs.

A lift device of an active hood system according to various aspects of the present invention may include a striker placed on the hood; a latch unit coupled to an engine compartment for selectively locking or unlocking the striker; and an elastic member placed between the striker and the latch unit for lifting the hood.

The latch unit may include: a base plate having an insertion recess that receives the striker; a latch pivotally coupled to the base plate and selectively locking the striker into the insertion recess; a first suspension lever pivotally coupled to the base plate and selectively locking the latch; a second suspension lever pivotally coupled to the base plate and selectively locking the first suspension lever; an actuator selectively activating the second suspension lever to release the latch locked to the first suspension lever; and elastic members applying elastic forces to the latch and the first and second suspension levers, respectively. The latch unit may be installed inside the engine compartment.

The lift device may further comprise a stopper unit that limits the lift height of the striker. The stopper unit may include: an outer panel fixed to the engine compartment and having a guide groove formed thereon, wherein the guide groove comprises a guide slot; an inner panel fixed to the striker and having a guide land thereon formed to be slidably inserted into the guide groove; and a stopper installed between the guide groove and the guide land via the guide slot and slidably connecting the inner panel and the outer panel to limit the lift height of the striker. The stopper may be separably fastened to any one of plurality of coupling holes formed on the guide land to adjust the lift height of the striker. The stopper may further include a plurality of insertion holes formed on the top surface of the outer panel; and a plurality of insertion pins fixed to the striker and slidably inserted into the respective insertion holes.

The lift device may further include a hinge unit pivoting the hood toward its rear. The hinge unit may include: a hood hinge flange fixed to the hood; a support flange positioned below the hood hinge flange; and first and second link members each having both ends hinge-connected to the hood hinge flange and the support flange to pivotably support the hood hinge flange.

In another exemplary embodiment of the present invention, a lift device of an active hood system for lifting up a hood, may include a hinge unit placed on a bottom surface of the hood and pivoting the hood in rear direction; a striker placed under the hinge unit; a latch unit fixed to an engine compartment and selectively locking or unlocking the striker; an elastic member placed between the striker and the engine compartment for lifting the hood; and a stopper unit telescopically connecting the striker and the engine compartment and limiting the lift height of the striker.

The hinge unit may include: a hood hinge flange fixed to the bottom surface of the hood; and a support flange positioned below the hood hinge flange and coupled to the hood hinge flange by at least a link. The at least a link may comprise first and second link members each having both ends hinge-connected to the hood hinge flange and the support flange and pivotably supports the hood hinge flange.

The striker may comprise an upper panel and a hanger, wherein the upper panel is connected to the stopper unit and the hanger is selectively coupled to the latch unit.

The latch unit may include: a base plate having an insertion recess to receive the striker; a latch pivotally coupled to the base plate and selectively locking the striker into the insertion recess of the base plate; a first suspension lever pivotally coupled to the base plate and selectively locking the latch; a second suspension lever pivotally coupled to the base plate and selectively locking the first suspension lever; an actuator selectively activating the second suspension lever to release the latch locked to the first suspension lever; and elastic members applying elastic forces to the latch and the first and second suspension levers, respectively. The first suspension lever may comprise a first trigger recess and a second trigger recess and a second suspension lever comprises a trigger arm and an activation arm, the first trigger recess of the first suspension lever is selectively engaged with the latch and the second trigger recess of the first suspension lever is selectively engaged with the trigger arm of the second suspension lever, and the activation arm of the second suspension lever is selectively activated by the actuator.

The stopper unit may include: an outer panel fixed to the engine compartment and having a guide groove formed thereon, wherein the guide groove comprises a guide slot; an inner panel fixed to the striker and having a guide land thereon formed to be telescopically inserted into the guide groove of the outer panel; and a stopper installed between the guide groove and the guide land via the guide slot and slidably connecting the inner panel and the outer panel to limit the lift height of the striker. The stopper may be selectively fastened to any one of plurality of coupling holes formed on the guide land to adjust the lift height of the striker. The stopper may comprise a plurality of insertion holes formed on the top surface of the outer panel; and a plurality of insertion pins fixed to the striker and slidably inserted into the respective insertion holes. The stopper may further comprise buffer members fixed to insertion pins The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary active hood system with a lift device according to an exemplary embodiment of the present invention lifts up a hood 30 (see, e.g., FIG. 5) during the collision of the vehicle with a pedestrian so as to minimize the impact applied to the pedestrian by providing a buffer space. The active hood system includes a lift device 100 installed in an engine compartment or between the hood 30 and an engine compartment 40, and an electronic control device ECU (not shown) driving a lift device 100 during the collision of the front of the vehicle with the pedestrian. One will appreciate that various control units may be utilized to provide a signal in an otherwise conventional manner in order to actuate the lift device in accordance with the present invention.

Figure 1:
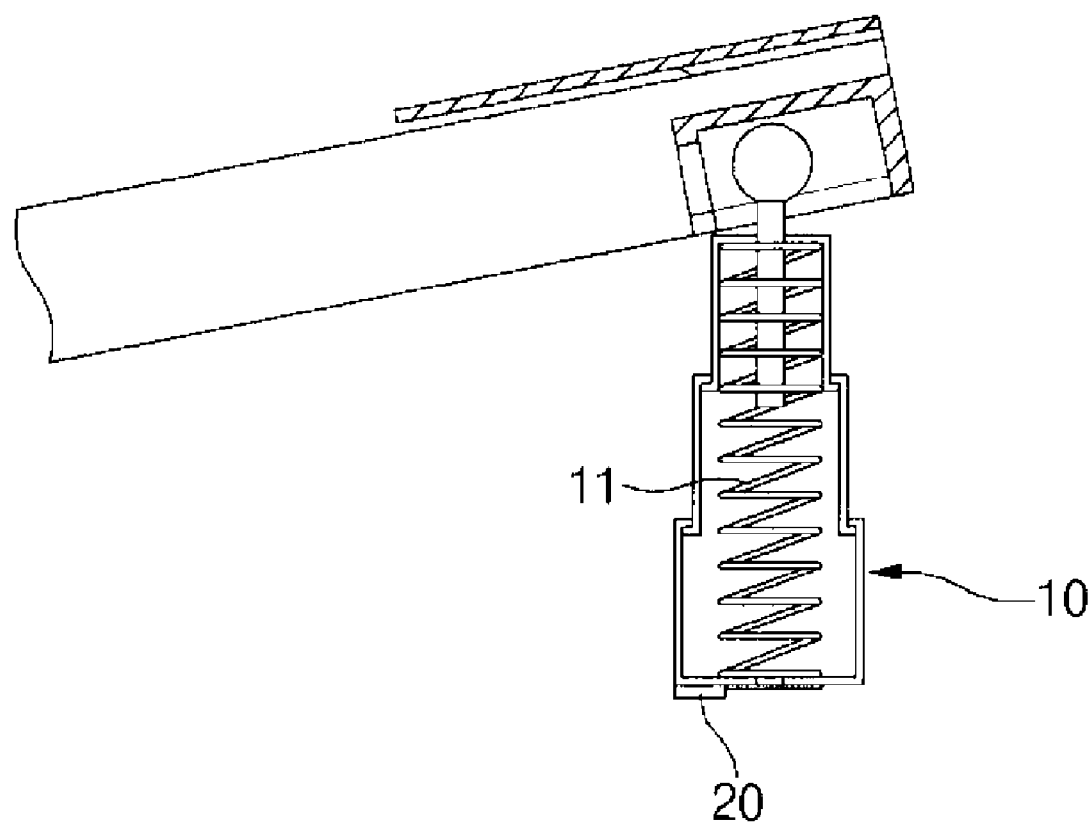
FIG. 1 is a cross-sectional view of a lift device of an active hood system.
Figure 2:
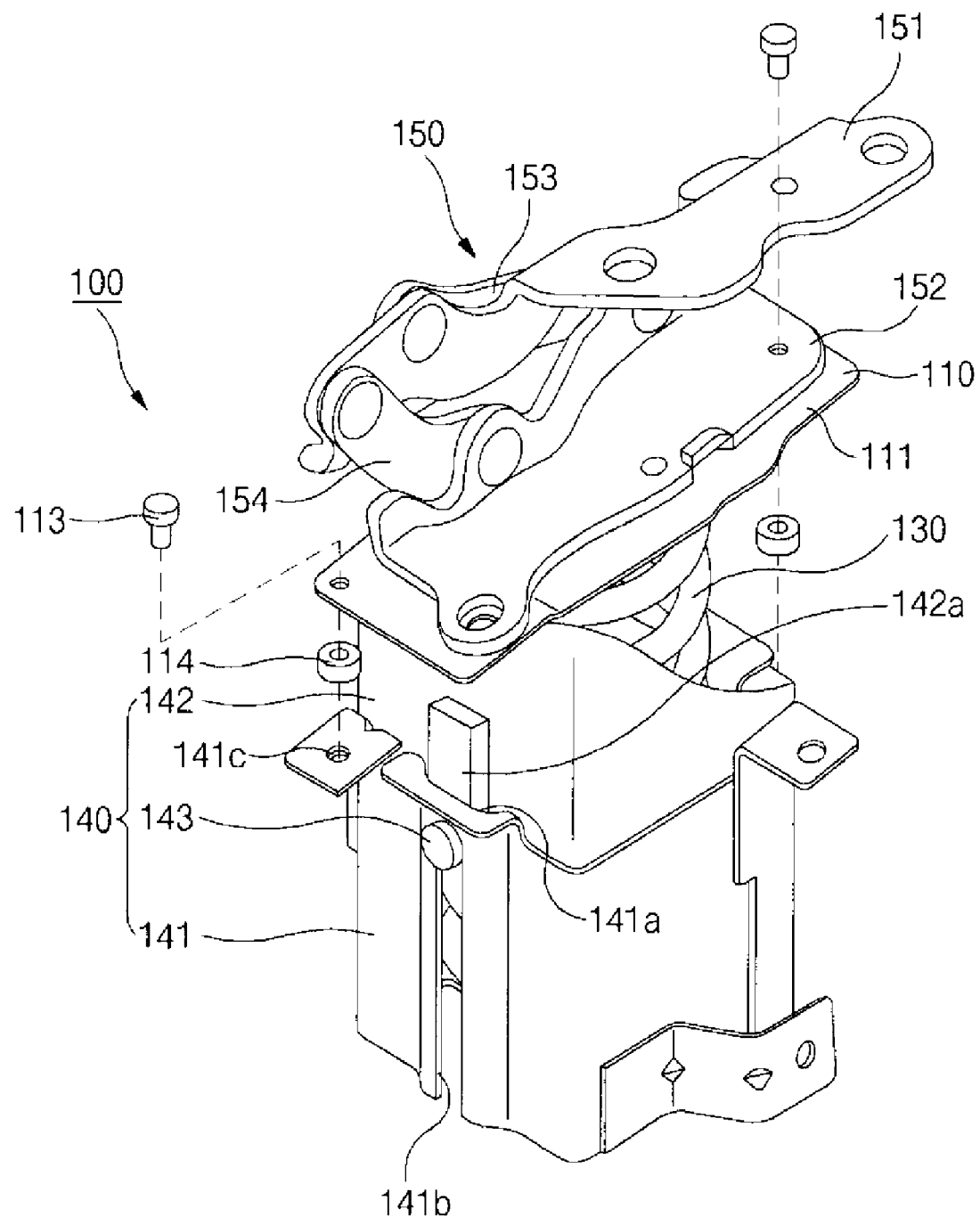
FIG. 2 is a perspective view of a lift device of an active hood system in accordance with various aspects of the present invention.
Figure 3:
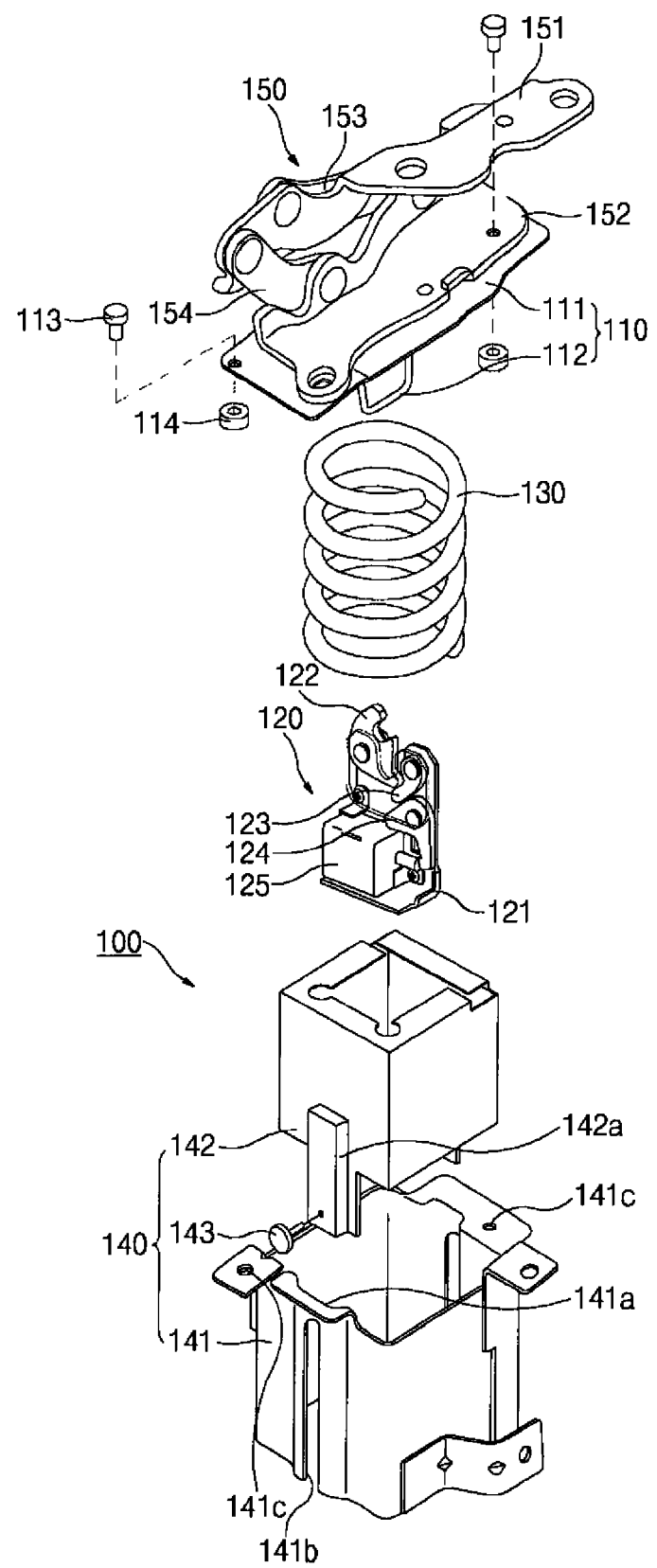
FIG. 3 is an exploded perspective view of the lift device of FIG. 2.

The lift device 100 shown in FIG. 2 selectively lifts up the front of the hood 30. To this end, the lift device 100 includes a striker 110 placed under a bottom surface of the hood 30, a latch unit 120 placed in the engine compartment 40 for locking or unlocking the striker 110, and an elastic member 130 placed between the striker 110 and a portion of the engine compartment 40 for lifting up the hood 30, as shown in FIG. 2. The lift device 100 further includes a stopper unit 140 that limits the amount the hood 30 rises, that is, the lift height, and a hinge unit 150 installed between the hood 30 and the latch unit 120 for fixing the hood 30 in such a manner as to be pivotable (or rotatable) in the rear direction of the vehicle body. The striker 110 includes an upper panel 111 placed under the bottom surface of the hood 30, and a hanger 112 (or a suspension ring, a mount ring, or a stop-hook) installed substantially on the central region of the bottom surface of the upper panel 111.

The latch unit 120 for locking or unlocking the striker 110 includes a base plate 121 placed on the upper surface of the engine compartment 40, and a latch 122 and first and second suspension levers (or stop levers or locking levers) 123 and 124 respectively installed pivotably (or rotatably) on the base plate 121. The latch unit 120 further includes a solenoid actuator 125 controlling a rotational direction of the second suspension lever 124 and springs 126, each engaged with the first and second suspension levers 123 and 124 and the latch 122 respectively to bring a restoring force. The base plate 121 has an insertion recess 121a, which is formed in the top side (or portion) of the base plate 121. The insertion recess 121a receives the hanger 112 of the striker 110. The latch 122 pivotally coupled to the base plate 121 locks or unlocks the hanger 112 of the striker 110, which is inserted into or released from the insertion recess 121a. The first suspension lever 123 comprises a first trigger recess 123a and a second trigger recess 123b. The first trigger recess 123a of the first suspension lever 123 pivotally engaged with a portion of the latch 122 performs a locking or unlocking combination with the latch 122 when the hanger 112 of the striker 110 is inserted into the insertion recess 121a.

The second suspension lever 124 comprises a trigger arm 124a and an activation arm 124b. The trigger arm 124a of the second suspension lever 124 is pivotally engaged with the second trigger recess 123b of the first suspension lever 121. Accordingly the second suspension lever 124 performs a locking or unlocking combination with the first suspension lever 123 when the latch 122 and the first suspension lever 123 are locked into each other via the first trigger recess 123a.

The solenoid actuator 125 controls the rotational direction of the activation arm 124b of the second suspension lever 124 such that an electronic control device ECU supplies an electric power to the solenoid actuator 125 and thus releases the locked state of the first suspension lever 123 with the latch 122 when an electric power is applied to the solenoid actuator 125 and the second suspension lever 124 rotates counterclockwise as the electronic control device ECU senses a collision of the vehicle body with the pedestrian. The springs 126 apply elastic restoring force to the first and second suspension levers 123 and 124 and the latch 122, respectively.

Figure 5:
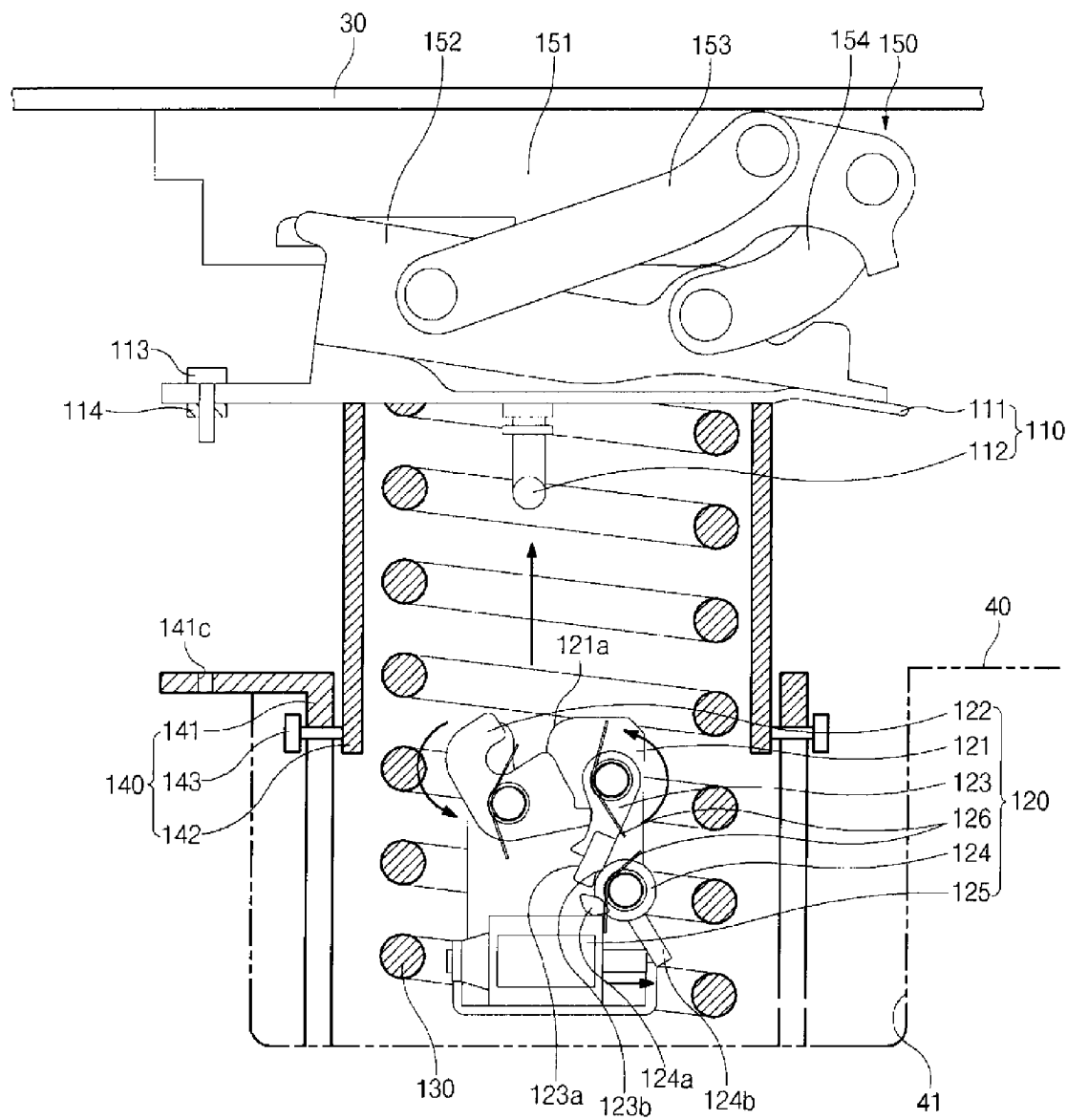
FIG. 5 is a cross-sectional view showing an unlocked state of the lift device of FIG. 2.

In detail, in such a latch unit 120, the electronic control device controls the solenoid actuator 125 to move the second suspension lever 124. The solenoid actuator moving the second suspension lever 124 in counterclockwise direction as shown in FIG. 5 makes the trigger arm 124a released from the second trigger recess 123b of the second suspension lever 124 to allow the first suspension lever 123, which is locked to the second suspension lever 124, to be rotated by a release force, which the latch 122 itself generates using the suppressed elastic force of an elastic member 130 (which will be described later). Simultaneously, the latch 122, which is locked to the first trigger recess 123a of the first suspension lever 123, is unlocked and the striker 110, which is locked by the latch 122, is also unlocked from the latch 122. The unlocked striker 110 is raised together with the hood 30 by the suppressed elastic restoring force of the elastic member 130, in the aforementioned state.

Thereafter, the solenoid actuator 125 returns to its original position. However, the latch 122 keeps unlocked with the first suspension lever 123. In this state, if the rear (or portion) of the hood 30 is pressed, the hanger 112 of the striker 110 progresses into the insertion recess 121a of the base plate 121 and rotates the latch 122 clockwise in the drawing. The rotated latch 122 is locked to the first suspension lever 123 and simultaneously enables the first suspension lever 123 to be locked to the second suspension lever 124. As a result, the striker 110 is restrained by the first suspension lever 123, and the elastic member 130 maintains the suppressed state once again.

The elastic member 130 pushes up the hood 30 using a restoring force. To this end, the elastic member 130 is placed between the upper panel 111 of the striker 110 and the engine compartment 40. The elastic member 130 preferably includes a coil spring.

Also, the stopper unit 140 included in the lift device 100 limits the lift height of the hood 30. To this end, the stopper unit 140 includes an outer panel 141 fixed to the engine compartment 40, an inner panel 142 fixed to the striker 110, wherein the inner panel 142 is telescopically engaged with the outer panel 141, and stoppers 143 slidably connecting the inner panel 142 with the outer panel 141 in order to limit the lift height of the inner panel 142.

In an exemplary embodiment of the present invention, the outer panel 141 is formed in the shape of a rectangular frame of which the top end is opened. The bottom of the outer panel 141 is fixed into a insertion holes 41, which is provided in the body of the engine compartment 20, by means of bolts or screws in such a manner as to receive the latch unit 120 therein. On both of the side walls of the outer panel 141, which are opposed to each other, guide grooves 141a are formed in a direction progressing from the top portion to the bottom portion of the outer panel 141, respectively. Also, guide slots 141b are formed on the respective guide grooves 141a.

In an exemplary embodiment of the present invention, the inner panel 142 has the shape of a rectangular frame smaller than the outer panel 141. The top potion of the inner panel 142 is fixed to the upper panel 111 of the striker 110, and the bottom portion of the inner panel 142 is movably inserted between the latch unit 120 and the outer panel 141. The inner panel 142 includes guide lands 142a formed, respectively, on both of the side walls. The guide lands 142a are slidably inserted into the respective guide grooves 141a and guide the inner panel 142 when the inner panel 142 is raised.

The stoppers 143 couple the outer panel 141 with the inner panel 142 and limit the lift height of the inner panel 142. To this end, the stoppers 143 are slidably fixed to the inner panel 142, passing through the guide slots 141b of the outer panel 141, respectively. Each of the stoppers 143 may include any one of a bolt, a rivet, a pin and so on. Accordingly, the stopper 143 allows the inner panel 141 to rise up and fall down within the length of the guide slot 141b. As a result, the stoppers 143 are able to limit the lift heights of the inner panel 142 and the hood 30.

Alternatively, each of the stoppers 143 may be engaged to any one of a plurality of coupling holes or openings formed on the guide lands 142a of the inner panel 142. In accordance various aspects of the present invention, the rising-up or lift height of the inner panel 142 may be adjustable and the springing-up height of the hood 30 may also be easily adjustable.

If the striker 110 is pushed up by the elastic member 130, the stoppers 143 rise up together with the striker 110 as the guide lands 142a of the inner panel 142 slide up along the respective guide grooves 141a of the outer panel 141. The stoppers 143 are stuck to the top end of the respective guide grooves 141b, and then the inner panel 142 and the striker 110 come to a stop.

In order to more precisely correct the coupling positions of the inner and outer panels 141 and 142, a correction unit may be provided between the outer panel 141 and the upper panel 111 of the striker 110. Such a correction unit includes a plurality of insertion holes 141c formed on the top surface (or edges) of the outer panel 141, and a plurality of insertion pins 113 fixed to the upper panel 111 of the striker 110 in such a manner as to pass through the upper panel 111 of the striker 110 and the respective insertion holes 141c.

Moreover, buffer members 114 can be additionally provided between the respective insertion holes 141c and the respective insertion pins 113. The buffer members 114 are combined with the respective insertion pins 113, passing through the upper panel 111. The buffer members 114 reduce noise and vibrations, which are generated during the contact of the outer panel 141 with the upper panel 111. To this end, the buffer members 114 may be formed of a synthetic resin that is expandable and contractible. One will appreciate that other materials may be used to form the buffer members.

The hinge unit 150 between the hood 30 and the striker 110 allows the hood 30 to pivot (or rotate) toward the rear of the vehicle body. Such a hinge unit 150 includes a hood hinge flange 151 fixed to the bottom surface of the hood 30, a support flange 152 having a lower surface mounted on the striker 110 below the hood hinge flange 151, and first and second link members 153 and 154 hinge-coupled with both the hood hinge flange 151 and support flange 152 for pivotably fixing the hood hinge flange 151 to the support flange 152.

When the hood 30 pivots toward the rear of the vehicle body, the hinge unit 150 allows the hood hinge flange 151 to operate in association with the hood 30. The associatively operated hood hinge flange 151 also pivots toward the rear of the vehicle body at the center of the support flange 152 by means of the linkage of the first and second link members 153 and 154.

Figure 4:
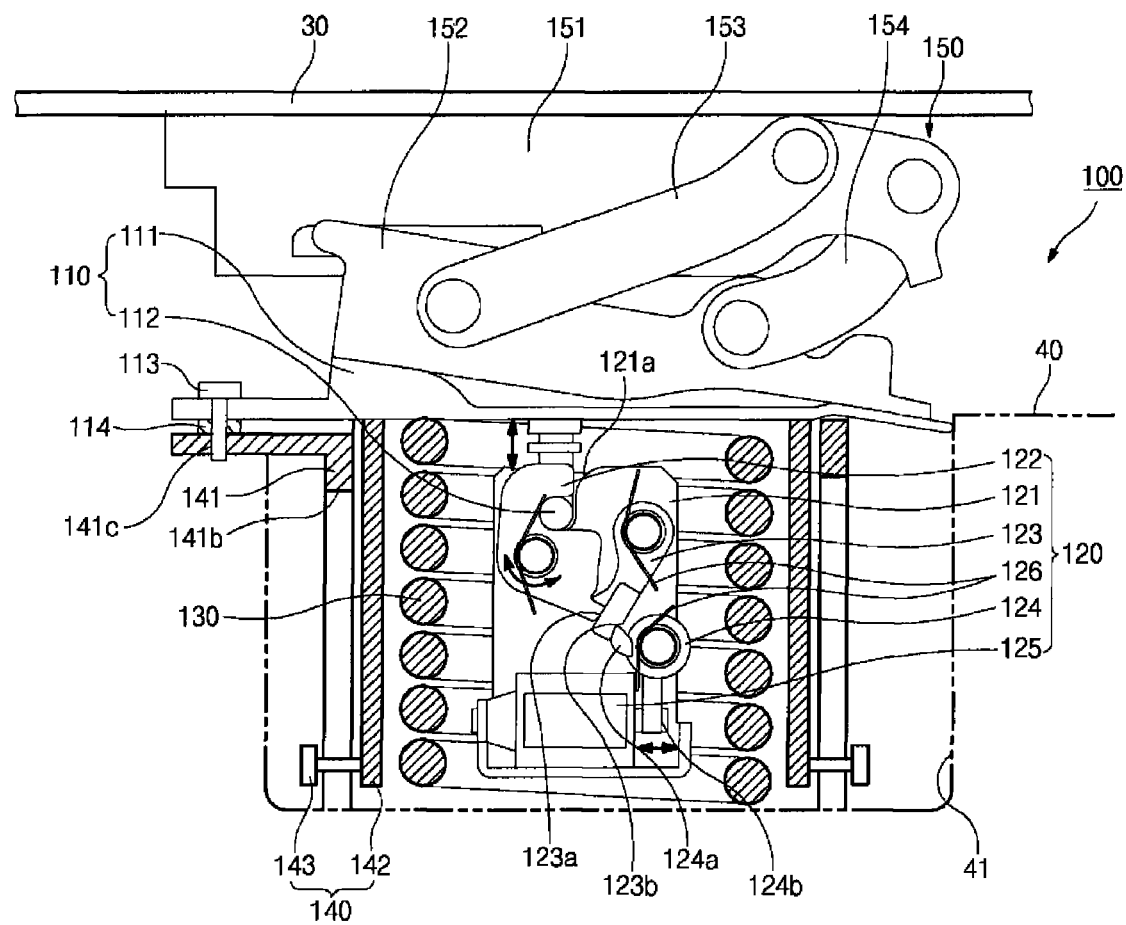
FIG. 4 is a cross-sectional view showing a locked state of the lift device of FIG. 2.

With respect to the operating states of the lift device of the active hood system having the aforementioned structure, a description will be now provided in reference to FIGS. 4 and 5.

Firstly, when the hood 30 is turned toward the rear of the vehicle body for the maintenance of the engine compartment, the hood hinge flange 151 also undergoes a turning movement with the support flange 152 in the center by means of the linkage of the first and second link members 153 and 154 in such a manner as to be in association with the hood 30. In this way, since the hood 30 is turned so as to open the engine compartment by the hinging function of the hinge unit 150, the difficulty of installing additional or separate hinge units may be eliminated and the costs of manufacturing the lift device of the active hood system and the vehicle may be greatly reduced.

Next, if the vehicle body has a collision with a pedestrian while the vehicle is being driven, the electronic control device ECU senses the collision and promptly applies the electric power to the lift device 100. The lift device 100 receiving the electric power releases the locked state of the striker 110 and enables the hood 30 to be simultaneously lifted up by the suppressed restoring elastic force of the elastic member 130. Accordingly, a sufficient buffer space is provided between the hood 30 and the engine compartment 40 and effectively buffers the impact force of the collision of hood 30 with the pedestrian, thereby protecting the pedestrian.

In other words, the electronic control unit ECU activates the solenoid actuator 125 of the latch unit 120 upon collision of the hood 30 with the pedestrian, as shown in FIG. 4. The activated solenoid actuator 125 turns (or rotates) the second suspension lever 124 in the counterclockwise so that the locking of the first suspension lever 123 and the latch 122 is released. Then, the elastic member 130 lifts up the hood 30 using the suppressed restoring elastic force, as shown in FIG. 5. As the stopper 143 fixed to the inner panel 142 is caught and suppressed at the top end of the guide slot 141b of the outer panel 141, the lifting-up hood 30 comes to a stop.

After the locking is released, the electronic control device ECU turns off the electric power being applied to the solenoid actuator 124 so that the link of the solenoid actuator 124 returns to home position. In this state, if the hood 30 is pressed, the hanger 112 of the striker 110 enters into the insertion recess 121a of the base plate 121 and moves the latch 122 in the clockwise. The rotated latch 122 is locked to the first trigger recess 123a of the first suspension lever 123 and the second trigger recess 123b of the first suspension lever 123 is locked to the trigger arm 124a of the second suspension lever 124 so that the first suspension lever 123 is also locked to the second suspension lever 124. Accordingly, the striker 110 is again locked. As a result, the lift device 100 of the active hood system can be reused.

Moreover, when the outer panel 141 and the upper panel 111 make close contact to each other, the insertion pins 113 are passed through the insertion hole 141C and allow the parts of the latch unit 120 to be precisely coupled with or secured to each other. The buffer member 115 greatly reduces vibrations and noise upon close contact of the outer and upper panels 141 and 111.

As described above, the lift device of the active hood system according to various exemplary embodiments of the present invention lifts up the hood by means of a mechanism, which operates mechanically under the elastic force of a suppressed member (i.e., a spring). Accordingly, the lift device of the active hood system greatly reduces the impact applied to the pedestrian during the collision of the vehicle body with the pedestrian and improves the security of the lift device.

Also, the lift device of an active hood system according to various exemplary embodiments of the present invention is locked or unlocked by means of the striker and the latch unit. As a result, the lift device of the active hood is reusable and easy to handle, and its manufacturing and repair costs are reduced.

For convenience in explanation and accurate definition in the appended claims, the terms "up" or "upper", "down" or "lower", "front" or "rear", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lift device of an active hood system for lifting up the rear of a hood, comprising:
   a striker placed under the hood;
   a latch unit mounted to an engine compartment for selectively locking or unlocking the striker; and
   an elastic member placed between the striker and the latch unit for lifting the hood,
   wherein the latch unit includes:
      a base plate having an insertion recess that receives the striker;
      a latch pivotally coupled to the base plate and selectively locking the striker into the insertion recess;
      a first suspension lever pivotally coupled to the base plate and selectively locking the latch;
      a second suspension lever pivotally coupled to the base plate and selectively locking the first suspension lever;
      an actuator selectively activating the second suspension lever to release the latch locked to the first suspension lever; and
      elastic members applying elastic forces to the latch and the first and second suspension levers, respectively.

2. The lift device of claim 1, wherein the latch unit is mounted inside within the engine compartment.

3. The lift device of claim 1, further comprising a stopper unit that limits the lift height of the striker.

4. The lift device of claim 3, wherein the stopper unit includes:
   an outer panel fixed to the engine compartment and having a guide groove formed thereon, wherein the guide groove comprises a guide slot;
   an inner panel fixed to the striker and having a guide land thereon formed to be slidably inserted into the guide groove; and
   a stopper mounted between the guide groove and the guide land via the guide slot and slidably connecting the inner panel and the outer panel to limit the lift height of the striker.

5. The lift device of claim 4, wherein the stopper is separably fastened to any one of plurality of coupling holes formed on the guide land to adjust the lift height of the striker.

6. The lift device of claim 4, further comprising:
   a plurality of insertion holes formed on the top surface of the outer panel; and
   a plurality of insertion pins fixed to the striker and slidably inserted into the respective insertion holes.

7. The lift device of claim 1, further comprising a hinge unit allowing the hood to move rearward.

8. The lift device of claim 7, wherein the hinge unit includes:
   a hood hinge flange fixed to the hood;
   a support flange positioned below the hood hinge flange; and
   first and second link members each having both ends hinge-connected to the hood hinge flange and the support flange to pivotably support the hood hinge flange.

9. A lift device of an active hood system for lifting up a hood, comprising:
   a hinge unit placed on a bottom surface of the hood and pivoting the hood in rear direction;
   a striker placed under the hinge unit;
   a latch unit fixed to an engine compartment and selectively locking or unlocking the striker;
   an elastic member placed between the striker and the engine compartment for lifting the hood; and
   a stopper unit telescopically connecting the striker and the engine compartment and limiting the lift height of the striker.

10. The lift device of claim 9, wherein the hinge unit includes:
    a hood hinge flange fixed to the bottom surface of the hood; and
    a support flange positioned below the hood hinge flange and coupled to the hood hinge flange by at least a link.

11. The lift device of claim 10, wherein the at least a link comprises first and second link members each having both ends hinge-connected to the hood hinge flange and the support flange and pivotably supports the hood hinge flange.

12. The lift device of claim 9, wherein the striker comprises an upper panel and a hanger, wherein the upper panel is connected to the stopper unit and the hanger is selectively coupled to the latch unit.

13. The lift device of claim 9, wherein the latch unit includes:
    a base plate having an insertion recess to receive the striker;
    a latch pivotally coupled to the base plate and selectively locking the striker into the insertion recess of the base plate;
    a first suspension lever pivotally coupled to the base plate and selectively locking the latch;
    a second suspension lever pivotally coupled to the base plate and selectively locking the first suspension lever;
    an actuator selectively activating the second suspension lever to release the latch locked to the first suspension lever; and
    elastic members applying elastic forces to the latch and the first and second suspension levers, respectively.

14. The lift device of claim 13, wherein the first suspension lever comprises a first trigger recess and a second trigger recess and a second suspension lever comprises a trigger arm and an activation arm, the first trigger recess of the first suspension lever is selectively engaged with the latch and the second trigger recess of the first suspension lever is selectively engaged with the trigger arm of the second suspension lever, and the activation arm of the second suspension lever is selectively activated by the actuator.

15. The lift device of claim 9, wherein the stopper unit includes:
    an outer panel fixed to the engine compartment and having a guide groove formed thereon, wherein the guide groove comprises a guide slot;
    an inner panel fixed to the striker and having a guide land thereon formed to be telescopically inserted into the guide groove of the outer panel; and
    a stopper installed between the guide groove and the guide land via the guide slot and slidably connecting the inner panel and the outer panel to limit the lift height of the striker.

16. The lift device of claim 15, wherein the stopper is selectively fastened to any one of plurality of coupling holes formed on the guide land to adjust the lift height of the striker.

17. The lift device of claim 15, further comprising:
    a plurality of insertion holes formed on the top surface of the outer panel; and
    a plurality of insertion pins fixed to the striker and slidably inserted into the respective insertion holes.

* * * * *